United States Patent
Kelwalkar et al.

(10) Patent No.: US 12,008,426 B2
(45) Date of Patent: Jun. 11, 2024

(54) DOUBLE SIDED CREDIT CARD

(71) Applicant: American Express Travel Related Services Company, Inc., New York, NY (US)

(72) Inventors: Anil B. Kelwalkar, Phoenix, AZ (US); Siva Kumar Edupuganti, Phoenix, AZ (US); James Bruce Coleman, Phoenix, AZ (US); Aditya Yallaturu, Edison, NJ (US)

(73) Assignee: AMERICAN EXPRESS TRAVEL RELATED SERVICES, COMPANY, INC., New York, NY (US)

( * ) Notice: Subject to any disclaimer, the term of this patent is extended or adjusted under 35 U.S.C. 154(b) by 0 days.

(21) Appl. No.: 17/887,054

(22) Filed: Aug. 12, 2022

(65) Prior Publication Data

US 2024/0054314 A1    Feb. 15, 2024

(51) Int. Cl.
*G06K 19/077* (2006.01)

(52) U.S. Cl.
CPC ... *G06K 19/07773* (2013.01); *G06K 19/0772* (2013.01)

(58) Field of Classification Search
CPC .................. G06K 19/07773; G06K 19/0772
USPC ...................................................... 235/492
See application file for complete search history.

(56) References Cited

U.S. PATENT DOCUMENTS

| | | | | |
|---|---|---|---|---|
| 6,064,486 A | * | 5/2000 | Chen | G03F 9/70 356/399 |
| 10,438,032 B1 | * | 10/2019 | Yaqub | G06K 19/0723 |
| 10,726,219 B1 | * | 7/2020 | Yaqub | G07F 7/0893 |
| 11,347,949 B2 | * | 5/2022 | Colby | G06Q 20/352 |
| 2003/0069846 A1 | * | 4/2003 | Marcon | G06Q 20/342 705/41 |
| 2010/0264227 A1 | * | 10/2010 | Joyce | G06K 19/077 235/487 |
| 2012/0122520 A1 | * | 5/2012 | Phillips | H04M 1/21 455/556.2 |
| 2017/0025484 A1 | * | 1/2017 | Forrest | H10K 59/35 |
| 2020/0251929 A1 | * | 8/2020 | Partovi | H01F 27/366 |
| 2020/0364532 A1 | * | 11/2020 | Herslow | H01Q 1/2225 |
| 2021/0256339 A1 | * | 8/2021 | Moncada | G06K 19/0721 |
| 2021/0350194 A1 | * | 11/2021 | Montealegre | G07F 7/086 |
| 2021/0350198 A1 | * | 11/2021 | Finn | G06K 19/07722 |
| 2023/0053541 A1 | * | 2/2023 | Yeh | H01F 27/24 |

(Continued)

*Primary Examiner* — Allyson N Trail
(74) *Attorney, Agent, or Firm* — Sterne, Kessler, Goldstein & Fox P.L.L.C.

(57) ABSTRACT

Disclosed herein is a system for a double-sided credit card and a method of manufacturing the same. In some embodiments, the double-sided credit card comprises a first side and a second side opposite to the first side. The first side comprises a first antenna configured to transmit electronic signals to execute transactions linked to a first financial account, while the second side comprises a second antenna configured to transmit electronic signals to execute transactions linked to a second financial account. An electronic blocker layer is positioned between the first side and the second side such that the electronic signals executing transactions linked to the first financial account is blocked from interfering with the electronic signals executing transactions linked to the second financial account.

20 Claims, 4 Drawing Sheets

(56) References Cited

U.S. PATENT DOCUMENTS

2023/0086189 A1* 3/2023 Finn .................. B29C 45/14647
235/488

* cited by examiner

DOUBLE SIDED CREDIT CARD

BACKGROUND

Field

The present application is generally related to a double-sided credit card and a method of manufacturing the same.

Related Art

As modern society moves toward a more digital age, most financial transactions are now conducted electronically using a credit or debit card rather than using physical cash. A customer may have multiple financial transaction cards, and each card may be of a different type and linked to a different financial account. For example, one customer may have a personal credit card linked to one financial account used for personal transactions and a business credit linked to a different financial account used for business transactions. The two financial accounts may have different benefits, such as different cashback rewards. In order to maximize on the various benefits offered by different financial accounts, a customer must acquire a large number of financial transaction cards to be used for different types of financial transactions. As the number of financial transaction cards a customer acquires increases, it becomes increasingly harder for the customer to keep track of the whereabouts of all the cards and to carry all the cards on the customer's person at all times. Therefore, there is a need to consolidate financial transaction cards to make them convenient to carry while still allowing the customer to retain the benefits of having multiple financial transaction cards linked to different financial accounts.

BRIEF SUMMARY

Disclosed herein are system, apparatus, device, and/or method embodiments, and/or combinations and sub-combinations thereof, for a double-sided credit card.

In some embodiments, a double-sided credit card comprises a first side and a second side opposite to the first side. The first side comprises a first antenna configured to transmit electronic signals to execute transactions linked to a first financial account, while the second side comprises a second antenna configured to transmit electronic signals to execute transactions linked to a second financial account. An electronic blocker layer is positioned between the first side and the second side. The electronic blocker layer is configured to block at least some of the electronic signals executing transactions linked to the first financial account from interfering with at least some of the electronic signals executing transactions linked to the second financial account.

In some examples, the double-sided credit card may further comprise a first microchip and a second microchip. The first microchip is embedded on the first side and positioned at a first end of the double-sided credit card, while the second microchip is embedded on the second side and positioned at a second end, opposite the first end, of the double-sided credit card. The first microchip is electrically coupled to the first antenna, which is configured to provide power to the first microchip during the transactions linked to the first financial account. The second microchip is electrically coupled to the second antenna, which is configured to provide power to the second microchip during the transactions linked to the second financial account.

In some examples, the double-sided credit card may further comprise a first magstripe and a second magstripe. The first magstripe is embedded on the first side and usable to execute the transactions linked to the first financial account, while the second magstripe is embedded on the second side and usable to execute the transactions linked to the second financial account.

In some examples, the first microchip and the first magstripe are both configured to store information of the first financial account that is used to process the transactions linked to the first financial account. In some examples, the second microchip and the second magstripe are both configured to store information of the second financial account that is used to process the transactions linked to the second financial account.

In some examples, the double-sided credit card may further comprise a first print layer that displays information on the first side that is used to process the transactions linked to the first financial account. In some examples, the double-sided credit card may further comprise a second print layer that displays information on the second side that is used to process the transactions linked to the second financial account. The information displayed and used to process either the transactions linked to the first financial account or the transactions linked to the second financial account may include at least one of a logo, a cardholder name, a card number, an expiration date, and a security code.

In some examples, the electronic blocker layer of the double-sided credit card is made of a ferrite material. In some examples, the electronic blocker layer of the double-sided credit card has a thickness that is sufficient to block all the electronic signals executing the transactions linked to the first financial account from interfering with all the electronic signals executing the transactions linked to the second financial account.

In another embodiment, a financial transaction card may comprise a first side, a second side, and an electronic blocker layer. The first side may include a first plurality of layers, including at least a first laminate layer, a first print layer, and a first antenna layer. The second side may include a second plurality of layers, including at least a second laminate layer, a second print layer, and a second antenna layer. The electronic blocker layer is positioned between the first plurality of layers and the second plurality of layers and configured to block at least some of electronic signals transmitted by the first antenna layer from interfering with at least some of electronic signals transmitted by the second antenna layer. The electronic signals transmitted by the first antenna layer execute transactions linked to a first financial account, and the electronic signals transmitted by the second antenna layer execute transactions linked to a second financial account.

In yet another embodiment, a method of manufacturing a double-sided financial transaction card may include printing, via a process selected from a group comprising at least silkscreen, lithography, and digital, a first print layer displayed on a first side of the double-sided financial transaction card and a second print layer displayed on a second side, opposite the first side, of the double-sided financial transaction card. The method may further inlay a first antenna on a first antenna layer and a second antenna on a second antenna layer. The method may connect, via electrical coupling, a first microchip to the first antenna and a second microchip to the second antenna. The method may further align, via computerized camera alignment registration, at least the first print layer, the first antenna layer, the second print layer, the second antenna layer, and an electronic blocker layer, wherein the electronic blocker layer separates the first antenna layer from the second antenna layer. Lastly, the method may laminate, via pressurization, the aligned layers between two clear laminate layers.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, and/or method embodiments, and/or combinations and sub-combinations thereof, for a double-sided credit card. Various embodiments of these features will now be discussed with respect to the corresponding figures.

An exemplary double-sided financial transaction card of the present application includes two transaction cards consolidated into the size of one transaction card. One of the two transaction cards is displayed on a first side (e.g., front side) of the double-sided financial transaction card, and the other of the two transaction cards is displayed on a second side (e.g., back side) of the double-sided financial transaction card. The two transaction cards may be of different types and/or may be linked to different financial accounts. For example, the transaction card shown on the first side of the double-sided financial transaction card may be a personal card linked to a personal financial account of a user, whereas the transaction card shown on the second side of the double-sided financial transaction card may be a business card linked to a business financial account of the user. Because different financial accounts may provide different benefits, such as different cashback rewards, a user may wish to acquire many different types of transaction cards linked to different financial accounts in order to maximize on the various benefits offered by each. Therefore, the consolidation of two transaction cards while still conforming to standard dimensions of a single transaction card allows the user to conveniently carry one, consolidated, double-sided financial transaction card while still benefiting from having multiple transaction cards linked to different financial accounts. Various embodiments of an exemplary double-sided financial transaction card will now be described in detail below.

Figure 1:
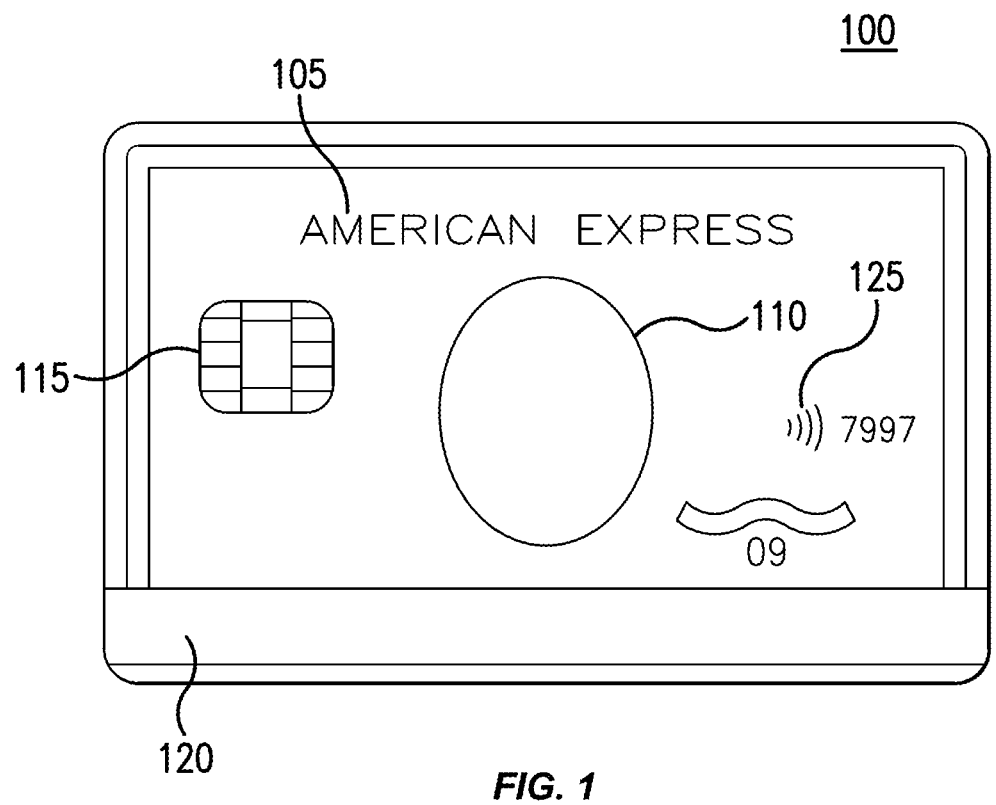
FIG. 1 depicts a first side of an exemplary double-sided financial transaction card, according to some embodiments.

FIG. 1 depicts a first side 100 of an exemplary double-sided financial transaction card, according to some embodiments. In the embodiment shown in FIG. 1, first side 100 displays a name 105 and a logo 110 of a merchant acquiring bank that issued the transaction card shown on first side 100. In other embodiments, first side 100 may further display other information of the transaction card shown on first side 100, including, but not limited to, a cardholder name, a card number, an expiration date, and a security code (not depicted). First side 100 may further display a first microchip 115 of the transaction card shown on first side 100, a first magstripe 120 of the transaction card shown on first side 100, and a symbol 125 signifying that the transaction card shown on first side 100 is configured to execute "contactless" financial transactions, as explained in further detail with reference to FIG. 3 below. It should be understood by those skilled in the art that various other features of the transaction card shown on first side 100 may be displayed in other embodiments of the exemplary double-sided financial transaction card and not exhaustively detailed herein.

Figure 2:
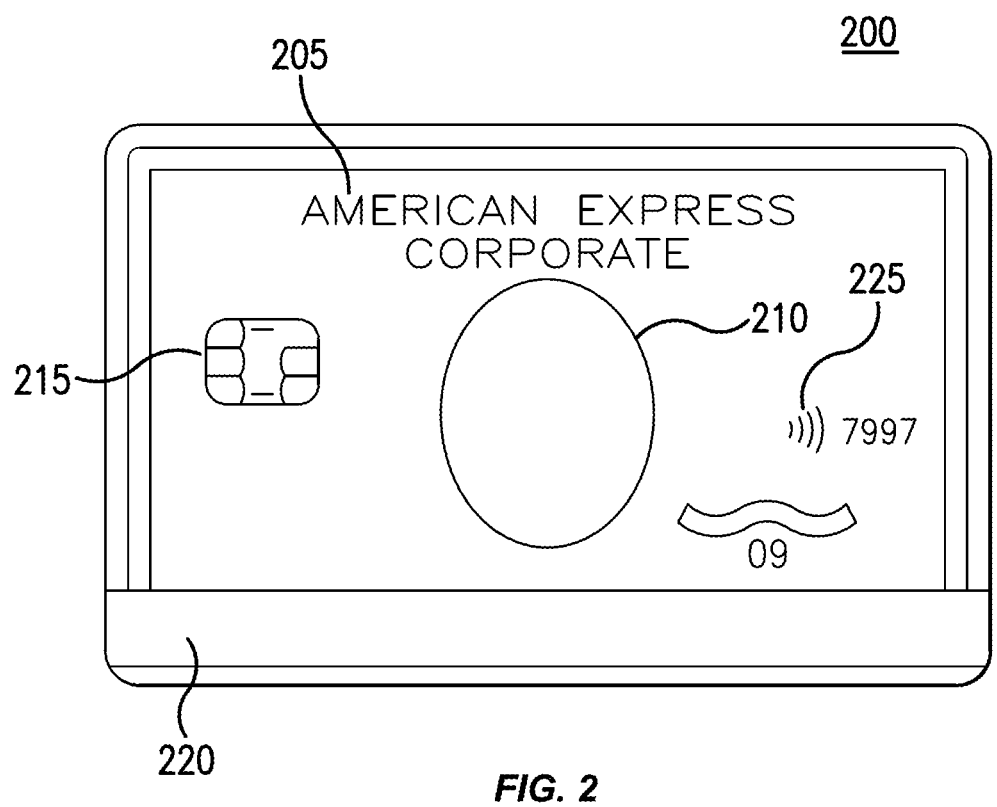
FIG. 2 depicts a second side of an exemplary double-sided financial transaction card, according to some embodiments.

FIG. 2 depicts a second side 200 of an exemplary double-sided financial transaction card, according to some embodiments. In the embodiment shown in FIG. 2, similar to first side 100 depicted in FIG. 1, second side 200 displays a name 205 and a logo 210 of a merchant acquiring bank that issued the transaction card shown on second side 200. Since the merchant acquiring bank that issued the transaction card shown on first side 100 may be the same as the merchant acquiring bank that issued the transaction card shown on second side 200, name 105 and logo 110 displayed on first side 100 may be the same as name 205 and logo 210 displayed on second side 200 in some embodiments of the present application. On the other hand, in other embodiments, name 105/205 may further specify a type of the transaction card displayed. For example, as shown in the embodiment of FIG. 2, name 205 displayed on second side 200 further includes "corporate," thus signifying that the transaction card shown on second side 200 is a business transaction card linked to a business financial account. In this scenario, name 205 displayed on second side 200 may be different from name 105 displayed on first side 100, even though logo 210 displayed on second side 200 and logo 110 displayed on first side 100 may be the same.

In some embodiments, second side 200 may further display other information of the transaction card shown on second side 200, including, but not limited to, a cardholder name, a card number, an expiration date, and a security code (not depicted). It should be understood by those skilled in the art that any combination of the other information enumerated above may be the same or different between first side 100 and second side 200. Second side 200 may further display a second microchip 215 of the transaction card shown on second side 200, a second magstripe 220 of the transaction card shown on second side 200, and a symbol 225 signifying that the transaction card shown on second side 200 is configured to execute "contactless" financial transactions, as explained in further detail with reference to FIG. 3 below. It should be understood by those skilled in the art that various other features of the transaction card shown on second side 200 may be displayed in other embodiments of the exemplary double-sided financial transaction card and not exhaustively detailed herein.

Figure 3:
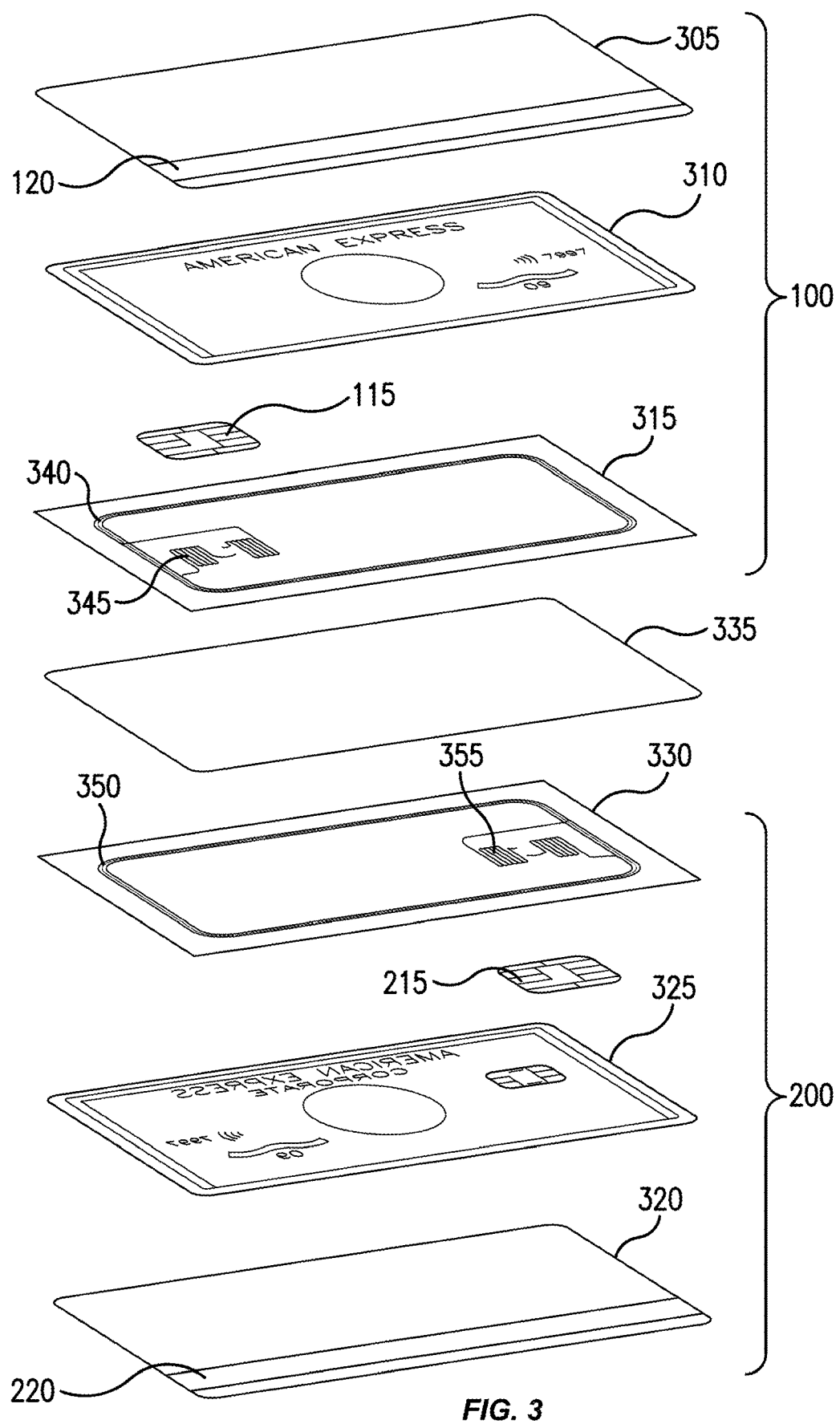
FIG. 3 depicts an exploded perspective view of an exemplary double-sided financial transaction card, according to some embodiments.

FIG. 3 depicts an exploded perspective view of an exemplary double-sided financial transaction card, according to some embodiments. In some embodiments, the exemplary double-sided financial transaction card includes multiple layers, some of which form the transaction card shown on first side 100 and some of which form the transaction card shown on second side 200, as explained in further detail below. In some embodiments, the transaction card shown on first side 100 may be used to execute transactions linked to a first financial account. On the other hand, the transaction card shown on second side 200 may be used to execute transactions linked to a second financial account. For example, in one embodiment, the first financial account may be a personal financial account whereas the second financial account may be a business financial account, or vice versa. As another example, in another embodiment, the first financial account may be a credit account whereas the second financial account may be a debit account. It should be understood by those skilled in the art that the first financial account linked to the transaction card shown on first side 100 and the second financial account linked to the transaction card shown on second side 200 may be various types of financial accounts not exhaustively detailed herein. It should also be understood by those skilled in the art that the variation in the types of financial accounts linked to the two transaction cards of the double-sided financial transaction card does not deviate from the teachings of the present application.

As shown in the embodiment of FIG. 3, the transaction card shown on first side 100 includes a first laminate layer 305, a first print layer 310, and a first antenna layer 315. Similarly, the transaction card shown on second side 200 includes a second laminate layer 320, a second print layer 325, and a second antenna layer 330. An electronic blocker layer 335 is positioned between layers 305-315 forming the transaction card shown on first side 100 and layers 320-330 forming the transaction card shown on second side 200. Electronic blocker layer 335 is configured to separate first side 100 and second side 200 of the double-sided financial transaction card, both physically and electrically, such that use of the transaction card shown on first side 100 does not interfere with use of the transaction card shown on second side 200, as described in further detail below. It should be understood by those skilled in the art that other embodiments of the present disclosure may include any number of layers in addition to or subtracting from the layers enumerated herein.

It should be understood by those skilled in the art that a user may complete either a "contact" transaction or a "contactless" transaction using a financial transaction card. In "contact" transactions, the user must physically insert a microchip or swipe a magstripe of the transaction card at a point of sale. In "contactless" transactions, the user may simply bring the transaction card within proximate range of the point of sale (e.g., by "tapping" the card) without physically inserting or swiping the card. The exemplary double-sided financial transaction card of the present application is capable of both "contact" and "contactless" transactions, as described in further detail below with reference to the layers forming each transaction card shown on opposite sides of the double-sided financial transaction card.

First Side Layers

First, layers 305-315 forming the transaction card shown on first side 100 will be described. In some embodiments, a first antenna 340 may be embedded in first antenna layer 315. First antenna 340 may be configured to transmit electronic signals used for communication and execution of "contactless" financial transactions of the transaction card shown on first side 100. First antenna 340 may further include first coils 345 configured to induce electricity when placed proximate to a point of sale terminal. First antenna 340 may be electrically coupled to first microchip 115 such that the induced electricity from first coils 345 of first antenna 340 may provide power to first microchip 115 during "contact" financial transactions of the transaction card shown on first side 100.

For aesthetic purposes, first print layer 310 may be positioned above first antenna layer 315, thus effectively hiding first antenna 340 embedded in first antenna layer 315 from view. First print layer 310 may further include a cut-out portion (not depicted) such that first microchip 115 embedded in first antenna layer 315 below may be accessible for insertion at a point of sale. First print layer 310 may display various information of the transaction card shown on first side 100, as described in further detail above with reference to FIG. 1. It should be understood by those skilled in the art that various other colors and designs may be implemented in first print layer 310 in various other embodiments without deviating from the teachings of the present application.

To protect the transaction card shown on first side 100 from wear-and-tear by potential hazards in the environment, first laminate layer 305 may be positioned above first antenna layer 315 and first print layer 310. In some embodiments, first laminate layer 305 may be a clear layer made from a polymer, such as polyvinyl chloride plastic. In other embodiments, first laminate layer 305 may be translucent or semi-translucent and made from another material that allows first laminate layer 305 to protect the transaction card shown on first side 100 from environmental hazards. First laminate layer 305 may further include a cut-out portion (not depicted) that aligns with the cut-out portion of first print layer 310 (not depicted) such that first microchip 115 embedded in first antenna layer 315 below may be accessible for insertion at a point of sale. Likewise, first magstripe 120 may be embedded in first laminate layer 305 such that first magstripe 120 may be accessible for swiping at a point of sale. It should be understood by those skilled in the art that first microchip 115 and first magstripe 120 both store information of the first financial account linked to the transaction card shown on first side 100. For example, first microchip 115 may be a microprocessor that uses a metallic chip to store the transaction card's code data, and first magstripe 120 may be a tape stripe that uses three magnetic tracks to store the transaction card's code data. This code data may then be used to authenticate transactions of the transaction card shown on first side 100.

It should further be understood by those skilled in the art that the specific configuration and order of layers 305-315 forming the transaction card shown on first side 100 of the exemplary double-sided financial transaction card may be different or varied in other embodiments of the present disclosure without deviating from the teachings herein. For example, in other embodiments, first microchip 115, first magstripe 120, and first antenna 340 may each be embedded on a different layer 305-315 from that described above. As another example, in other embodiments, the order of layers 305-315 forming the transaction card shown on first side 100 may be different.

Second Side Layers

Next, layers 320-330 forming the transaction card shown on second side 200 will be described. In some embodiments, the configuration of layers 320-330 forming the transaction card shown on second side 200 may be a mirror-image of the configuration of layers 305-315 forming the transaction card shown on first side 100. In some embodiments, a second antenna 350 may be embedded in second antenna layer 330. Second antenna 350 may be configured to transmit electronic signals used for communication and execution of "contactless" financial transactions of the transaction card shown on second side 200. Second antenna 350 may further include second coils 355 configured to induce electricity when placed proximate to a point of sale terminal. Second antenna 350 may be electrically coupled to second microchip 215 such that the induced electricity from second coils 355 of second antenna 350 may provide power to second microchip 215 during "contact" financial transactions of the transaction card shown on second side 200.

For aesthetic purposes, second print layer 325 may be positioned above second antenna layer 330, thus effectively hiding second antenna 350 embedded in second antenna layer 330 from view. Second print layer 325 may further include a cut-out portion (not depicted) such that second microchip 215 embedded in second antenna layer 330 below may be accessible for insertion at a point of sale. In some embodiments, second microchip 215 is aligned to be offset from first microchip 115 on the exemplary double-sided financial transaction card. Because microchips need a certain thickness to maintain integrity for operation, offsetting second microchip 215 from first microchip 115 ensures that the exemplary double-sided financial transaction card may be inserted into a point of sale and conforms to a standard thickness of transaction cards, as specified by the International Organization for Standardization ("ISO"). For example, first microchip 115 and second microchip 215 may be positioned at opposite ends of the exemplary double-sided financial transaction card. In other examples, first microchip 115 and second microchip 215 may be positioned offset from each other such that no overlap occurs, but first microchip 115 and second microchip 215 are not necessarily positioned at opposite ends of the exemplary double-sided financial transaction card. It should be understood by those skilled in the art that various offset placements for first microchip 115 and second microchip 215 may be possible in different embodiments of the present disclosure and not exhaustively detailed herein.

As described in further detail above with reference to FIG. 2, second print layer 325 may display various information of the transaction card shown on second side 200. It should be understood by those skilled in the art that various other colors and designs may be implemented in second print layer 325 in various other embodiments without deviating from the teachings of the present application.

To protect the transaction card shown on second side 200 from wear-and-tear by potential hazards in the environment, second laminate layer 320 may be positioned above second antenna layer 330 and second print layer 325. In some embodiments, second laminate layer 320 may be a clear layer made from a polymer, such as polyvinyl chloride plastic. In other embodiments, second laminate layer 320 may be translucent or semi-translucent and made from another material that allows second laminate layer 320 to protect the transaction card shown on second side 200 from environmental hazards. Second laminate layer 320 may further include a cut-out portion (not depicted) that aligns with the cut-out portion of second print layer 325 (not depicted) such that second microchip 215 embedded in second antenna layer 330 below may be accessible for insertion at a point of sale. Likewise, second magstripe 220 may be embedded in second laminate layer 320 such that second magstripe 220 may be accessible for swiping at a point of sale. It should be understood by those skilled in the art that second microchip 215 and second magstripe 220 both store information of the second financial account linked to the transaction card shown on second side 200. For example, second microchip 215 may be a microprocessor that uses a metallic chip to store the transaction card's code data, and second magstripe 220 may be a tape stripe that uses three magnetic tracks to store the transaction card's code data. This code data may then be used to authenticate transactions of the transaction card shown on second side 200.

It should further be understood by those skilled in the art that the specific configuration and order of layers 320-330 forming the transaction card shown on second side 200 of the exemplary double-sided financial transaction card may be different or varied in other embodiments of the present disclosure without deviating from the teachings herein. For example, in other embodiments, second microchip 215, second magstripe 220, and second antenna 350 may each be embedded on a different layer 320-330 from that described above. As another example, in other embodiments, the order of layers 320-330 forming the transaction card shown on second side 200 may be different.

Electronic Blocker Layer

Referencing FIG. 3, electronic blocker layer 335 is positioned between layers 305-315 forming the transaction card shown on first side 100 and layers 320-330 forming the transaction card shown on second side 200. In some embodiments, electronic blocker layer 335 is configured to block at least some of the electronic signals transmitted by first antenna 340 embedded in first antenna layer 315 from interfering with at least some of the electronic signals transmitted by second antenna 350 embedded in second antenna layer 330, and vice versa. In some embodiments, electronic blocker layer 335 is configured to block all the electronic signals transmitted by first antenna 340 from interfering with all the electronic signals transmitted by second antenna 350. In some embodiments, electronic blocker layer 335 may be made of ferrite material. In other embodiments, electronic blocker layer 335 may be made of another material that allows electronic blocker layer 335 to successfully block the electronic signals transmitted by first antenna 340 and the electronic signals transmitted by second antenna 350 from interfering with each other.

In some embodiments, electronic blocker layer 335 should be sufficiently thick to block any and all electronic signals between first side 100 and second side 200. It should be understood by those skilled in the art that the thickness of electronic blocker layer 335 and the thicknesses of each layer forming the two transaction cards of the exemplary double-sided financial transaction card may be varied in different embodiments of the present disclosure and not exhaustively detailed herein. For example, ISO standard thickness for financial transaction cards is defined as 30 mils (i.e., one mil equals one thousandth of an inch), with a margin of error of 10%. Therefore, in order to comply with ISO standards, the financial transaction card may have a maximum thickness of 33 mils. In embodiments of the present disclosure, the thickness of electronic blocker layer 335 and the individual thicknesses of each layer 305-315, 320-330 may be varied, as long as the thickness of electronic blocker layer 335 is sufficient to block any and all electronic signals between first side 100 and second side 200 and the combined thickness of all layers of the exemplary double-sided financial transaction card is less than the maximum allowed thickness of 33 mils.

In some embodiments, electronic blocker layer 335 should be sufficiently large to block any and all electronic signals between first side 100 and second side 200. It should be understood by those skilled in the art that the dimensions of electronic blocker layer 335 and the dimensions of each layer forming the two transaction cards of the exemplary double-sided financial transaction card may be varied in different embodiments of the present disclosure and not exhaustively detailed herein. For example, ISO standard dimensions for financial transaction cards is defined as 85.60 mm by 53.98 mm (or, 3⅜ in by 2⅛ in, approximately), with rounded corners and a radius of 2.88 mm to 3.48 mm (or, ⅛ in, approximately). Therefore, in embodiments of the present disclosure, the dimensions of electronic blocker layer 335 and the dimensions of each layer 305-315, 320-330 may be varied, as long as the overall dimensions of the exemplary double-sided financial transaction card are compliant with the ISO standard dimensions for financial transaction cards.

Manufacturing Method

Figure 4:
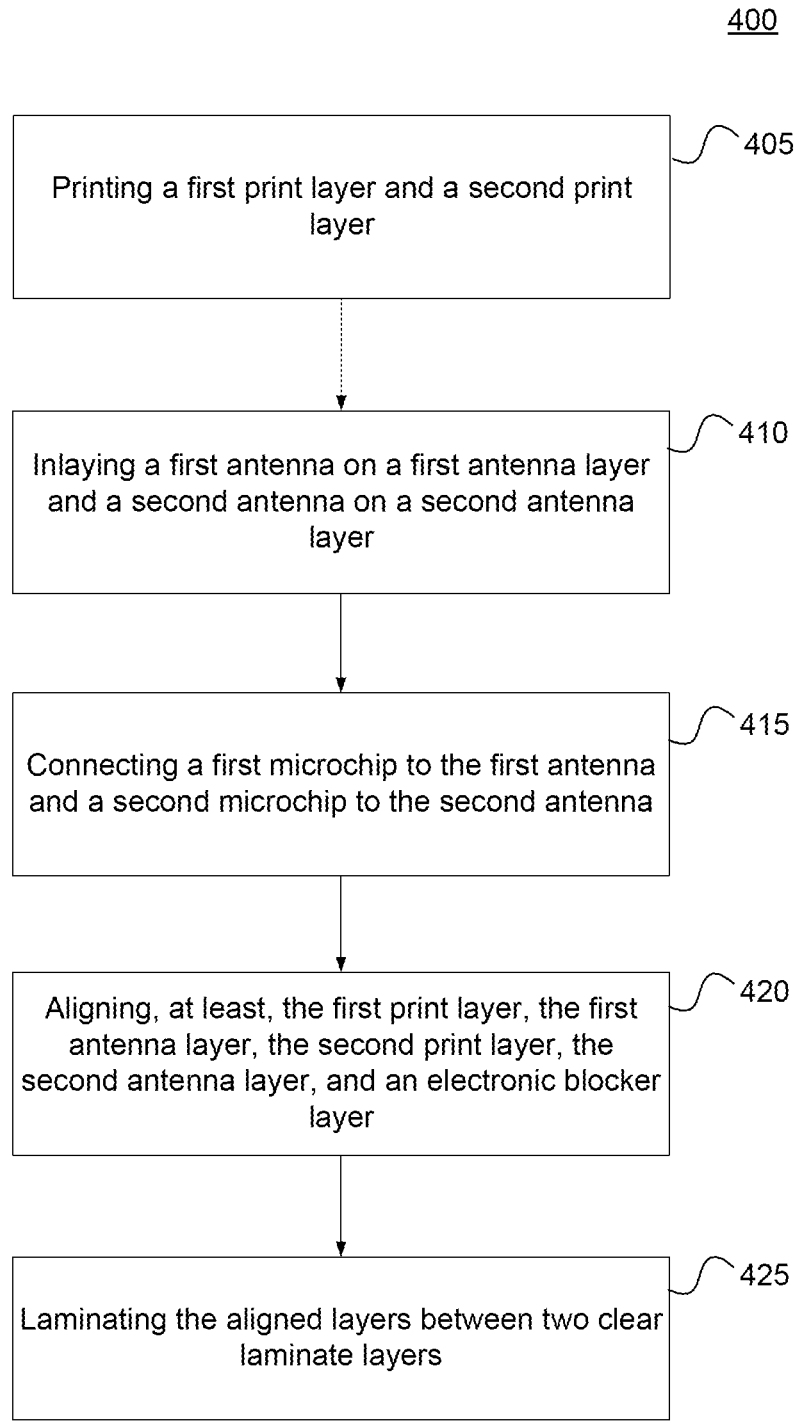
FIG. 4 depicts a flowchart illustrating an exemplary method for manufacturing a double-sided financial transaction card, according to some embodiments.

FIG. 4 depicts a flowchart illustrating an exemplary method 400 for manufacturing a double-sided financial transaction card, according to some embodiments. Method 400 will now be described with reference to FIG. 3 and FIG. 4.

At step 405, method 400 prints first print layer 310 displayed on first side 100 and second print layer 325 displayed on second side 200. Various methods known to those of ordinary skill in the art may be used to print first print layer 310 and second print layer 325. For example, method 400 may use a silkscreen printing process, a lithography printing process, or a digital printing process to print first print layer 310 and second print layer 325. Silkscreen printing, also known as serigraphy or serigraph printing, is a printing technique where a mesh is used to transfer ink or dye onto a substrate, except in areas made impermeable to the ink by a blocking stencil. Open mesh apertures are filled with ink until the desired design and appearance for first print layer 310 and/or second print layer 325 is produced. Lithography printing is a planographic method of printing that utilizes the immiscibility of oil and water. The image to be printed is initially drawn with a greasy substance, such as oil, fat, or wax, onto a smooth plate. The plate is then treated with an acid that etches areas of the plate unprotected by the greasy substance, thereby creating the print that may be used to create the desired design and appearance for first print layer 310 and/or second print layer 325. Digital printing is a method of printing from a digital-based image directly to a variety of media, including first print layer 310 and/or second print layer 325. It should be understood by those skilled in the art that various other methods of printing may be used in different embodiments of the present disclosure to print first print layer 310 and second print layer 325 of the exemplary double-sided financial transaction card.

At step 410, method 400 inlays first antenna 340 on first antenna layer 315 and second antenna 350 on second antenna layer 330. During this inlay step 410, method 400 must properly align first antenna 340 with first antenna layer 315 such that first antenna 340 is properly positioned and registered to transmit the electronic signals executing transactions linked to the transaction card shown on first side 100. Likewise, method 400 must properly align second antenna 350 with second antenna layer 330 such that second antenna 350 is properly positioned and registered to transmit the electronic signals executing transactions linked to the transaction card shown on second side 200. Antennas 340/350 must be properly embedded into antenna layers 315/330, respectively, such that a flat inlay is created.

At step 415, method 400 electrically connects first microchip 115 to first antenna 340 and second microchip 215 to second antenna 350. This allows first antenna 340 to provide induced electricity to power first microchip 115 during "contact" financial transactions of the transaction card shown on first side 100. Likewise, this allows second antenna 350 to provide induced electricity to power second microchip 215 during "contact" financial transactions of the transaction card shown on second side 200. Various methods known to those of ordinary skill in the art may be used to connect microchips 115/215 to antennas 340/350, respectively. For example, method 400 may use conductive glue, wire bonding, and/or inductive coupling to achieve the electrical connection in step 415. It should be understood by those skilled in the art that various other methods of forming electrical connections may be used in different embodiments of the present disclosure and not exhaustively disclosed herein.

At step 420, method 400 aligns various layers of the exemplary double-sided financial transaction card, such as layers 305-315 forming the transaction card shown on first side 100, layers 320-330 forming the transaction card shown on second side 200, and electronic blocker layer 335. During the alignment process 420, method 400 inserts electronic blocker layer 335 such that it physically separates layers 305-315 forming the transaction card shown on first side 100 and layers 320-330 forming the transaction card shown on second side 200. This ensures that electronic blocker layer 335 physically separates first antenna 340 inlayed in first antenna layer 315 (see step 410) from second antenna 350 inlayed in second antenna layer 330 (see step 410), thereby preventing the electronic signals transmitted by first antenna 340 to execute transactions linked to the transaction card shown on first side 100 from interfering with the electronic signals transmitted by second antenna 350 to execute transactions linked to the transaction card shown on second side 200, and vice versa. In some embodiments, method 400 uses a process of computerized camera alignment to complete step 420. In other embodiments, various other alignment methods known to those of ordinary skill in the art may be used without deviating from the teachings of the present application. The alignment process of step 420 stacks all layers of the exemplary double-sided credit card together, performs registration between each layer such that each layer is aligned within a margin of error (e.g., 0.5 mm), and welds select spots of the aligned layers together in preparation for lamination, which is described in further detail below.

At step 425, method 400 laminates the aligned layers from step 420 between two laminate layers. In some embodiments, the two laminate layers are clear layers made from a polymer. In other embodiments, the two laminate layers are translucent or semi-translucent layers made from stainless steel panels or another material that may adequately protect the exemplary double-sided financial transaction card from environmental hazards. In some embodiments, the lamination of step 425 uses a pressurization process to apply pressure to the aligned layers and to bake the pressurized layers at a certain temperature (e.g., 160 degrees) for a certain time period (e.g., 30 minutes). In other embodiments, various other methods known to those of ordinary skill in the art may be used to complete the lamination step 425 of method 400. Furthermore, it should be understood by those skilled in the art that various pressures, temperatures, and time periods may be used in step 425 in other embodiments of the present disclosure and not exhaustively detailed herein.

In some embodiments, method 400 may optionally include additional post-lamination steps to create a different texture or varnish of the exemplary double-sided financial transaction card. For example, post-lamination varnish may be applied to create a "glossy" design for the surface of the double-sided financial transaction card. Other post-lamination steps may be applied in various other embodiments of the present disclosure and not exhaustively described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

It should be readily understood that the meaning of "on," "above," and "over" in the present disclosure should be interpreted in the broadest manner such that "on" not only means "directly on" something, but also includes the meaning of "on" something with an intermediate feature or a layer therebetween. Moreover, "above" or "over" not only means "above" or "over" something, but can also include the meaning it is "above" or "over" something with no intermediate feature or layer therebetween (i.e., directly on something).

Further, spatially relative terms, such as "beneath," "below," "lower," "above," "upper," and the like, can be used herein for ease of description to describe one element or feature's relationship to another element(s) or feature(s) as illustrated in the figures. The spatially relative terms are intended to encompass different orientations of the device in use or process step in addition to the orientation depicted in the figures. The apparatus can be otherwise oriented (rotated 90 degrees or at other orientations) and the spatially relative descriptors used herein can likewise be interpreted accordingly.

The breadth and scope of this disclosure should not be limited by any of the above-described exemplary embodiments, but should be defined only in accordance with the following claims and their equivalents.

What is claimed is:

1. A transaction card, comprising:
   a first side comprising a first magstripe and a first antenna configured to transmit electronic signals to execute transactions linked to a first account;
   a second side, opposite the first side, comprising a second magstripe and a second antenna configured to transmit electronic signals to execute transactions linked to a second account, wherein the first magstripe and the second magstripe are positioned along a same longitudinal edge of the transaction card; and
   an electronic blocker layer positioned between the first side and the second side, wherein the electronic blocker layer is configured to block at least some of the electronic signals executing the transactions linked to the first account from interfering with at least some of the electronic signals executing the transactions linked to the second account.

2. The transaction card of claim 1, wherein
   the first side further comprises a first microchip positioned at a first end of the transaction card and electrically coupled to the first antenna, and
   the second side further comprises a second microchip positioned at a second end, opposite the first end, of the transaction card and electrically coupled to the second antenna.

3. The transaction card of claim 2, wherein
   the first antenna is configured to provide power to the first microchip during the transactions linked to the first account, and
   the second antenna is configured to provide power to the second microchip during the transactions linked to the second account.

4. The transaction card of claim 2, wherein
   the first microchip is configured to store information of the first account that is used to process the transactions linked to the first account, and
   the second microchip is configured to store information of the second account that is used to process the transactions linked to the second account.

5. The transaction card of claim 1, wherein
   the first magstripe is configured to store information of the first account that is used to process the transactions linked to the first account, and
   the second magstripe is configured to store information of the second account that is used to process the transactions linked to the second account.

6. The transaction card of claim 1, wherein
   the first side further comprises a first print layer that displays information on the first side that is used to process the transactions linked to the first account, and
   the second side further comprises a second print layer that displays information on the second side that is used to process the transactions linked to the second account.

7. The transaction card of claim 6, wherein the information used to process at least one of the transactions linked to the first account and the transactions linked to the second account includes at least one of a logo, a cardholder name, a card number, an expiration date, and a security code.

8. The transaction card of claim 1, wherein the electronic blocker layer is made of ferrite material.

9. The transaction card of claim 1, wherein the electronic blocker layer has a thickness that is sufficient to block all the electronic signals executing the transactions linked to the first account from interfering with all the electronic signals executing the transactions linked to the second account.

10. The transaction card of claim 1, wherein
the first account is a personal account, and
the second account is a business account.

11. The transaction card of claim 1, wherein the transaction card is configured to be inserted into a point of sale; and
wherein dimensions of the electronic blocker layer and the dimensions of the first side and the second side of the transaction card are equal.

12. A transaction card, comprising:
a first side comprising a first plurality of layers, the first plurality of layers including at least a first laminate layer, a first print layer, and a first antenna layer;
a second side, opposite the first side, comprising a second plurality of layers, the second plurality of layers including at least a second laminate layer, a second print layer, and a second antenna layer;
a first magstripe embedded in the first laminate layer;
a second magstripe embedded in the second laminate layer, wherein the first magstripe and the second magstripe are positioned along a same longitudinal edge of the transaction card; and
an electronic blocker layer positioned between the first plurality of layers and the second plurality of layers, wherein
the electronic blocker layer is configured to block at least some of electronic signals transmitted by the first antenna layer from interfering with at least some of electronic signals transmitted by the second antenna layer,
the electronic signals transmitted by the first antenna layer execute transactions linked to a first account, and
the electronic signals transmitted by the second antenna layer execute transactions linked to a second account.

13. The transaction card of claim 12, further comprising:
a first microchip and a first antenna embedded in the first antenna layer, wherein the first antenna is electrically coupled to the first microchip and configured to provide power to the first microchip during the transactions linked to the first account, and
a second microchip and a second antenna embedded in the second antenna layer, wherein the second antenna is electrically coupled to the second microchip and configured to provide power to the second microchip during the transactions linked to the second account.

14. The transaction card of claim 13, wherein the first microchip is aligned to be offset from the second microchip in the transaction card.

15. The transaction card of claim 13, wherein
the first microchip is configured to store information of the first account that is used to process the transactions linked to the first account, and
the second microchip is configured to store information of the second account that is used to process the transactions linked to the second account.

16. The transaction card of claim 12,
wherein the first magstripe is configured to store information of the first account that is used to process the transactions linked to the first account; and
wherein the second magstripe is configured to store information of the second account that is used to process the transactions linked to the second account.

17. The transaction card of claim 12, wherein
the first print layer displays information used to process the transactions linked to the first account,
the second print layer displays information used to process the transactions linked to the second account, and
the information used to process at least one of the transactions linked to the first account and the transactions linked to the second account includes at least one of a logo, a cardholder name, a card number, an expiration date, and a security code.

18. The transaction card of claim 12, wherein
the electronic blocker layer has a thickness that is sufficient to block all the electronic signals transmitted by the first antenna layer from interfering with all the electronic signals transmitted by the second antenna layer.

19. The transaction card of claim 12, wherein the electronic blocker layer is made of ferrite material.

20. A method of manufacturing a double-sided transaction card, comprising:
printing, via a process selected from a group comprising at least silkscreen, lithography, and digital, a first print layer displayed on a first side of the double-sided transaction card and a second print layer displayed on a second side, opposite the first side, of the double-sided transaction card;
inlaying a first antenna on a first antenna layer and a second antenna on a second antenna layer;
connecting, via electrical coupling, a first microchip to the first antenna and a second microchip to the second antenna;
aligning, via computerized camera alignment registration, at least the first print layer, the first antenna layer, the second print layer, the second antenna layer, an electronic blocker layer, wherein the electronic blocker layer separates the first antenna layer from the second antenna layer; and
laminating, via pressurization, the aligned layers between two clear laminate layers wherein a first laminate layer comprises a first magstripe and a second laminate layer comprises a second magstripe, and the first magstripe and the second magstripe are positioned along a same longitudinal edge of the double-sided transaction card.

* * * * *